United States Patent
Prater et al.

(10) Patent No.: US 6,437,932 B1
(45) Date of Patent: Aug. 20, 2002

(54) DECISION BASED TIME-VARYING EQUALIZERS

(75) Inventors: James S. Prater; Kevin G. Christian, both of Fort Collins, CO (US)

(73) Assignee: LSI Logic Corporation, Milpitas, CA (US)

( * ) Notice: Subject to any disclaimer, the term of this patent is extended or adjusted under 35 U.S.C. 154(b) by 0 days.

(21) Appl. No.: 08/648,849

(22) Filed: May 16, 1996

(51) Int. Cl.[7] .................................................. G11B 5/09
(52) U.S. Cl. .......................... 360/46; 360/65; 375/233; 708/323
(58) Field of Search .............................. 360/65, 46, 67, 360/45; 375/233, 232; 364/724.2, 724.19

(56) References Cited

U.S. PATENT DOCUMENTS

| | | | |
|---|---|---|---|
| 3,798,560 A | 3/1974 | Taylor | 328/167 |
| 4,985,902 A | 1/1991 | Gurcan | 375/14 |
| 5,132,988 A | 7/1992 | Fisher et al. | 375/14 |
| 5,268,848 A | 12/1993 | Coker et al. | 364/724.19 |
| 5,283,483 A | 2/1994 | Laber et al. | 307/520 |
| 5,293,402 A | 3/1994 | Crespo et al. | 375/14 |
| 5,321,559 A | 6/1994 | Nguyen et al. | 360/46 |
| 5,335,251 A * | 8/1994 | Onishi et al. | 375/347 |
| 5,398,259 A * | 3/1995 | Tsujimoto | 375/233 |
| 5,430,661 A | 7/1995 | Fisher et al. | 364/488 |
| 5,471,504 A | 11/1995 | Lee et al. | |
| 5,517,527 A * | 5/1996 | Yu | 375/233 |
| 5,539,774 A * | 7/1996 | Nobakht et al. | 375/232 |
| 5,543,978 A * | 8/1996 | Park | 360/65 |
| 5,572,503 A | 11/1996 | Satoh et al. | |
| 5,654,765 A * | 8/1997 | Kim | 348/614 |
| 5,675,612 A * | 10/1997 | Solve et al. | 375/326 |

FOREIGN PATENT DOCUMENTS

| JP | 07169055 | 7/1995 |
|---|---|---|

OTHER PUBLICATIONS

"Adaptive Volterra–DFE and Timing Recovery in Digital Magnetic Recording System", pp. 41–44, 13 Arthor(s) Lin et al., International Symposium of Circuits and Systems. (ISCAS) Communication and Visual Signal Processing (CVSP), London, May 30–Jun. 2, 1994.

"An Adaptive DFE for Storage Channels Suffering for Nonlinear ISI", pp. 1638–1642,13 Author(s) Fisher et al., World Prosperity Through Communications, Boston, Jun. 11–14, 1989, vol. 3, IEEE.

"A 200Mb/s Analog DFE Read Channel", pp. 72–73,— Arthor(s) Sands et al., IEEE International Solid State Circuits Conference, vol. 39, No. 1, Feb. 1, 1996.

"Adaptive Equalization in magnetic–Dick Storage Channels," Cioffi, John M. et al., *IEEE Communication Magazine*, Feb. 1990, pp. 14–29.

"Density Improvements in Digital Magnetic Recording by Decision Feedback Equalization," Bergmans, Jan W. M., *IEEETransactions on Magnetics*, vol.,, MAG–22, No. 3, May 1986, pp. 157–162.

* cited by examiner

*Primary Examiner*—Alan T. Faber
(74) *Attorney, Agent, or Firm*—Carstens Yee & Cahoon, L.L.P.

(57) ABSTRACT

An apparatus having a first filter means for adjusting an input signal based on past data output from the apparatus. In addition, a summing means is used to sum signals from the first filter means and from a second filter means to produce a sum signal. The apparatus includes a symbol detection means for generating an output signal from the sum signal. The second filter means provides adjustments in the output signal based on the peaks and plurality of past signals generated by the symbol detection means. A control means is included for controlling the filtering properties of both the first and second filter means, wherein the control means controls the filtering properties based on the past output signals from the symbol detection means.

7 Claims, 9 Drawing Sheets

DECISION BASED TIME-VARYING EQUALIZERS

BACKGROUND OF THE INVENTION

1. Technical Field

The present invention relates generally to digital signal transmissions and in particular to equalizers. Still more particularly, the present invention relates to an improved decision feedback equalizer.

2. Description of the Related Art

The advent of the information age has increased the demand for the storage of digital data, along with the demands for processing and transmission of such data. The density of information stored in a single system has been increased to accommodate the growing demand. For example, the capacity of magnetic disks storage units has grown fueled by improvements in the design of heads and disks, improvements in magnetic media, decreases in head gap length and flying height, and improvements in servo accuracy for increased track density.

The growing demand for digital storage capacity has also prompted an interest in the use of digital signal processing methods as a means of continuing increases in density. The general similarity of read and write processes in disk and tape drive units to data detection in transmission and communication systems has focussed interest on the application of equalization and coding methods to channels for both tape and disk drive systems. In particular, read channels have received special attention because the information has to be processed faster. Equalizers are used in both tape and disk drive read channels. In particular, decision feedback equalizers have been used to recover digital signals in read channels. Two types of noise dominate magnetic recording and read channels. One is regular noise caused, by thermal noise in electronics and random variations in the magnetic media. The other type of noise is intersymbol interference (ISI). Regular noise is found everywhere and effects all channels. ISI becomes worse with increasing density. Pulses generated by transitions in the magnetic media tend to overlap as transitions become closer with higher recording densities. Many of these decision feedback equalizers incorporate finite impulse response (FIR) filters to reduce errors caused by interference between successive pulses of data. This interference is also known as intersymbol interference (ISI). Additionally, errors may occur when the peas of positive and negative pulses do not have the same magnitude.

Presently available equalizers used in read channels contain coefficients that are determined to reduce errors in data transmission (e.g., ISI). The presently available adaptive equalizers adapt or alter coefficients based on an error signal derived from errors in the output of the read channel. These equalizer coefficients, however, are not optimal for all possible types of data patterns. Therefore, it would be advantageous to have an improved apparatus for equalizing signals to reduce errors in transmission of data.

SUMMARY OF THE INVENTION

The apparatus of the present invention includes a first filter means for adjusting an input signal based on past data output from the apparatus. In addition, a summing means is used to sum signals from the first filter means and from a second filter means to produce a summed signal. The apparatus includes a symbol detection means for generating an output signal from the summed signal. The second filter means provides adjustments in the output signal based on the peaks and polarity of past signals generated by the symbol detection means. A control means is included for controlling the filtering properties of both the first and second filter means, wherein the control means controls the filtering properties based on the past output signals from the symbol detection means.

The above as well as additional objectives, features, and advantages of the present invention will become apparent in the following detailed written description.

DESCRIPTION OF THE DRAWINGS

The novel features believed characteristic of the invention are set forth in the appended claims. The invention itself, however, as well as a preferred mode of use, further objectives and advantages thereof, will best be understood by reference to the following detailed description of an illustrative embodiment when read in conjunction with the accompanying drawings, wherein:

DETAILED DESCRIPTION

Figure 1:
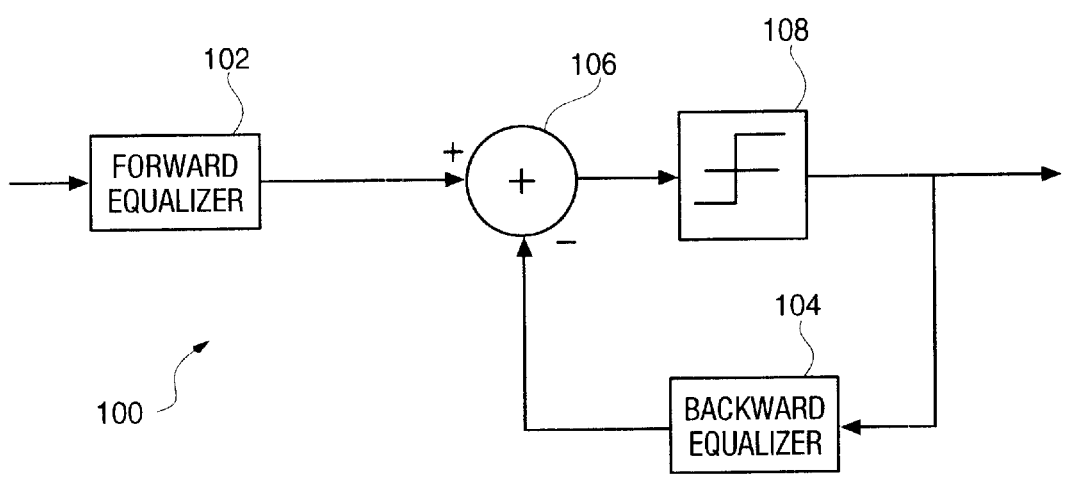
FIG. 1 is a block diagram of a decision feedback equalizer (DFE) depicted in accordance with a preferred embodiment of the present invention.

With reference now to the figures, and in particular with reference to FIG. 1, a block diagram of a decision feedback equalizer (DFE) 100 is depicted in accordance with a preferred embodiment of the present invention. DFE 100 includes a forward equalizer 102, a backward equalizer 104, a summing circuit 106, and a symbol detector 108, such as, for example, a slicer. DFE 100 is used for suppressing inter-symbol interference (ISI) in high density magnetic recording, according to the present invention. Forward equalizer 102 receives an analog input waveform according to the present invention. Forward equalizer 102 filters the signal based on prior data patterns in accordance with a preferred embodiment of the present invention. The filtered signal is sent to summing circuit 106, which sums the signal from forward equalizer 102 and from backward equalizer 104 to produce a summed signal. Backward equalizer 104 modifies the signal by subtracting the trailing edges of pulses in the waveform in accordance with a preferred embodiment of the present invention. Often times the trailing edges of a positive pulse and a negative pulse are different. Slicer 108 produces a best estimate of the data symbol, given an input from summing circuit 106.

According to the present invention, DFE 100 sets the coefficients in forward equalizer 102 based on the data pattern generated by symbol detector 108 rather than on an error measure as is the case for presently available adaptive equalizers. Similarly, the coefficients in backward equalizer 104 are selected on the basis of the polarity of past pulses rather than on a measurement of error in the output from DFE 100 according to the present invention. These coefficients are selected to reduce errors caused by various data patterns and peaks having different magnitudes.

For example, forward equalizer 102 in DFE 100 can be designed to compensate for various effects in the magnetic read channel. Forward equalizer 102 is employed to sharpen the leading edge of pulses received by DFE 100. Under linear channel assumptions, without noise, a single set of forward equalizer coefficients is optimal for all data patterns. According to a preferred embodiment of the present invention, forward a equalizer 102 has coefficients adapted for filtering pulses based on the polarity of the waveform as determined by symbol detector 108 according to the present invention. Typically with MR heads, a bigger pulse occurs in one direction than the other. Forward equalizer 102 is adapted to correct for the difference between the pulse sizes. While forward equalizer 102 does not know what bit is coming next, the expected polarity of the next pulse can be determined from the output of symbol detector 108. With magnetic media, the polarity of the next pulse is opposite of the last pulse. For example, if a "0" comes next, nothing will be present to equalize but if a "1" is next, forward equalizer 102 can be set correctly for the polarity for the pulse using different sets of coefficients according to the present invention. Once noise, however, is added, some data patterns are more susceptible to noise than other data patterns. Thus, designing or setting forward equalizer 102 with less noise boost for the most noise sensitive patterns usually reduces this type of susceptibility and improves performance within the read channel.

Alternatively forward equalizer 102 also can be set based on past data patterns in the form of a series of zeros and ones. For example, if the most error prone pattern were an isolated one, such as 0 0 0 1 0 0 0, the three zeros could be detected and the coefficients switched from the normal forward equalizer coefficients, optimized over all patterns, to a second set of coefficients that is optimized for patterns with three leading zeros. Forward equalizer 102 adjusts for past data patterns. Backward equalizer 104 is used to adjust for offsets between peaks in a signal.

Backward equalizer 104 subtracts off the trailing edges of pulses. Similarly, the coefficients in backward equalizer 104 could be altered depending on the polarity of the pulses and the magnitude of the peaks of the pulses according to the present invention. According to the present invention, forward equalizer 102 and backward equalizer 104 may be implemented either by using an adaptive or time varying filter and placing different sets of coefficients within the equalizers depending on the past data. Alternatively, forward equalizer 102 and backward equalizer 104 may be implemented using a number of different filters, with each filter having a fixed set of coefficients according to the present invention. In particular, the coefficients for the filters are identified using a time domain adaptive filter method called least means square (LMS), which uses a training sequence and adjusts the filter coefficients to obtain the right response. More information of DFEs may be found in Proakis, *Digital Communications,* McGraw-Hill, Inc., 3d ed., 1995, ISBN No. 0-07-051726-6. More information on filters, filter design, and selection of coefficients for filters may be found in Ifeachor and Jervis, *Digital Signal Processing: A Practical Approach,* Addison-Wesley Publishers Company, Inc., 1995, ISBN No. 0-201-54413-X. More information of the use of DFEs with respect to magnetic recording can be found in Cioffi, et al., *Adaptive Equalization in Magnetic-Disk Storage Channels,* IEEE Communications Magazine, February 1990, pages 14–29 and Density Improvements in Digital Magnetic Recording *by Decision Feedback Equalization,* Bergmans, IEEE transactions on Magnetics, vol. MAG-22, number 3, May 1986, pages 157–162. According to a preferred embodiment of the present invention, LMS is preferred for determining filter coefficient.

With reference now to FIGS. 2A–2D, more detailed block diagrams of DFEs are depicted in accordance with a preferred embodiment of the present invention. According to the present invention the forward equalizers (e.g., a filter bank containing FIR filters or a single FIR filter connected to a memory containing different sets of coefficients) are employed to sharpen the leading edges of pulses based on a data pattern, such as a series of logic zeros followed by a logic one or on the expected polarity of the next pulse. The backward equalizer cancels tails based on the polarity of the pulses according to the present invention. The backward equalizer detects the polarity of the pulse and knows that the trailing edge will interfere with the next pulse and the proper set of coefficients is selected to cancel the trailing edge to eliminate interference according to the present invention. DFE 300 in FIG. 2A includes a filter bank 302 containing FIR filters 304, 306, and 308 according to the present invention. The output of FIR filters 304, 306, and 308 in filter bank 302 are connected to summing circuit 304 with the output of summing circuit 304 being connected to slicer 306. DFE 300 also includes a backward equalizer 308 with the output bits from slicer 306 used as an input into backward equalizer 308 as in a conventional DFE. Additionally, the data bits from slicer 306 are directed into selection logic 310, which selects one of FIR filters 304, 306, or 308 in filter bank 302 based on the data output from slicer 306 according to the present invention. In this manner, the best FIR filter in filter bank 302 may be selected for a given prior data pattern for different symbol decisions generated by slicer 308 to minimize data errors caused by a particular data pattern according to the present invention.

Although filter bank 302 contains FIR filters, other filters may be implemented in accordance with a preferred embodiment of the present invention. For example, infinite impulse response (IIR) filters or continuous time filters may be implemented in place of FIR filters 304, 306, and 308. Although the depicted example shows only three filters, other numbers of filters may be implemented according to the present invention.

Figure 2A:
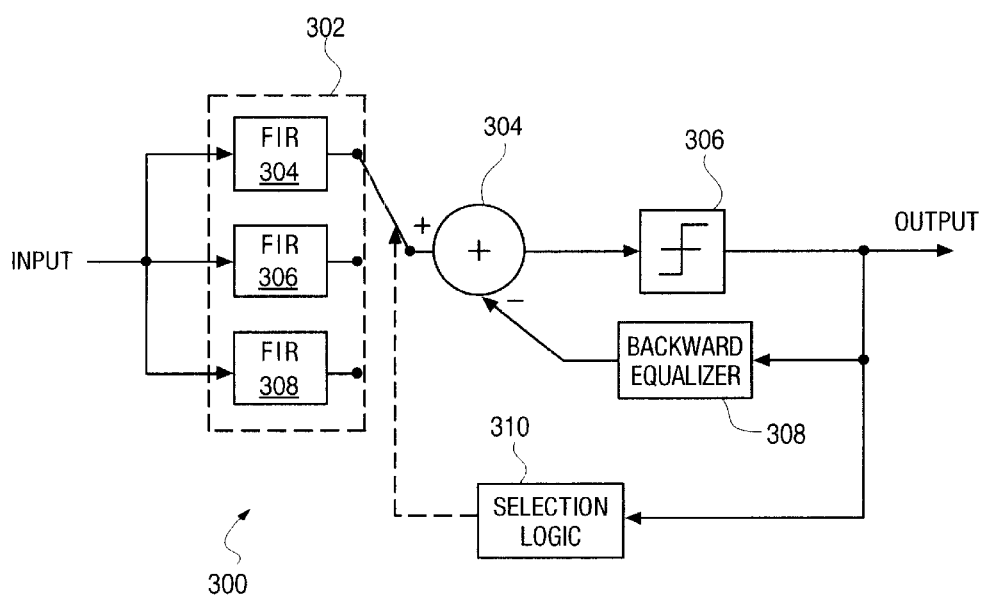
FIGS. 2A–2D are more detailed block diagrams of DFEs depicted in accordance with a preferred embodiment of the present invention.
Figure 2B:
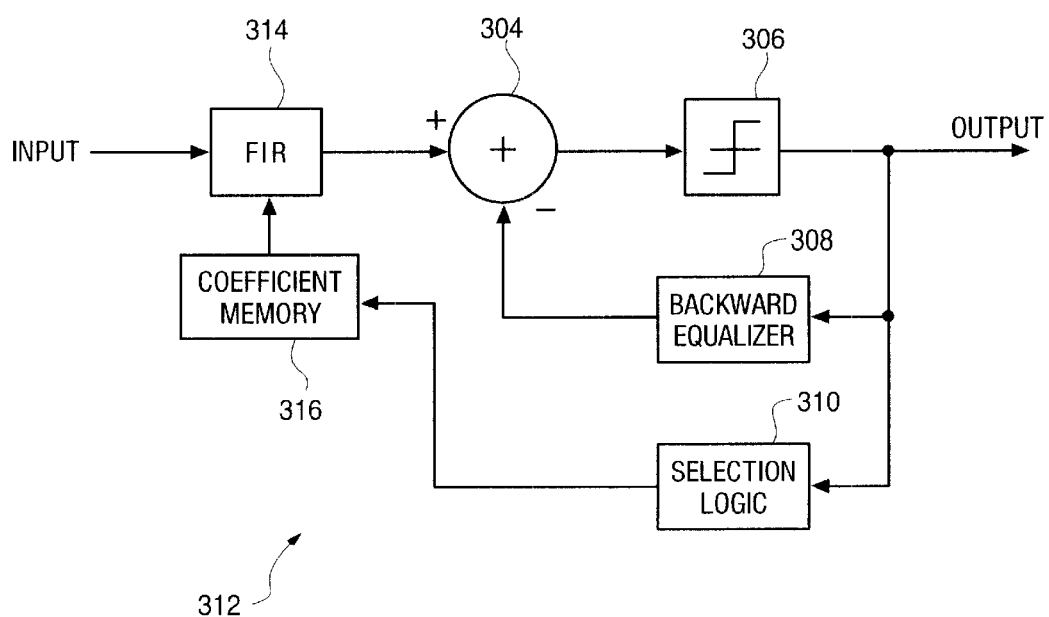

In FIG. 2B, DFE 312 employs a single FIR filter 314 with time varying coefficients instead of a filter bank 302 in FIG. 3A. Different sets of coefficients are stored within coefficient memory 316. A set of coefficients from the different sets of coefficients is selected from coefficient memory 316 by selection logic 310 in response to data patterns output by slicer 306 according to the present invention. The set of coefficients selected for use in FIR filter 314 is selected to minimize data errors caused by a particular waveform being sent through DFE 312 according to the present invention.

Slicer 306 should be able to provide immediate decisions on each symbol so that selection logic 310 can function properly. Although the depicted examples show as slicer, such as slicer 306, more complex detectors can be employed according to the present invention. For example, slicer 306 maybe employed to estimate pulse polarity and a more complex detector may be employed to generate feedback bits according to the present invention.

Figure 2C:
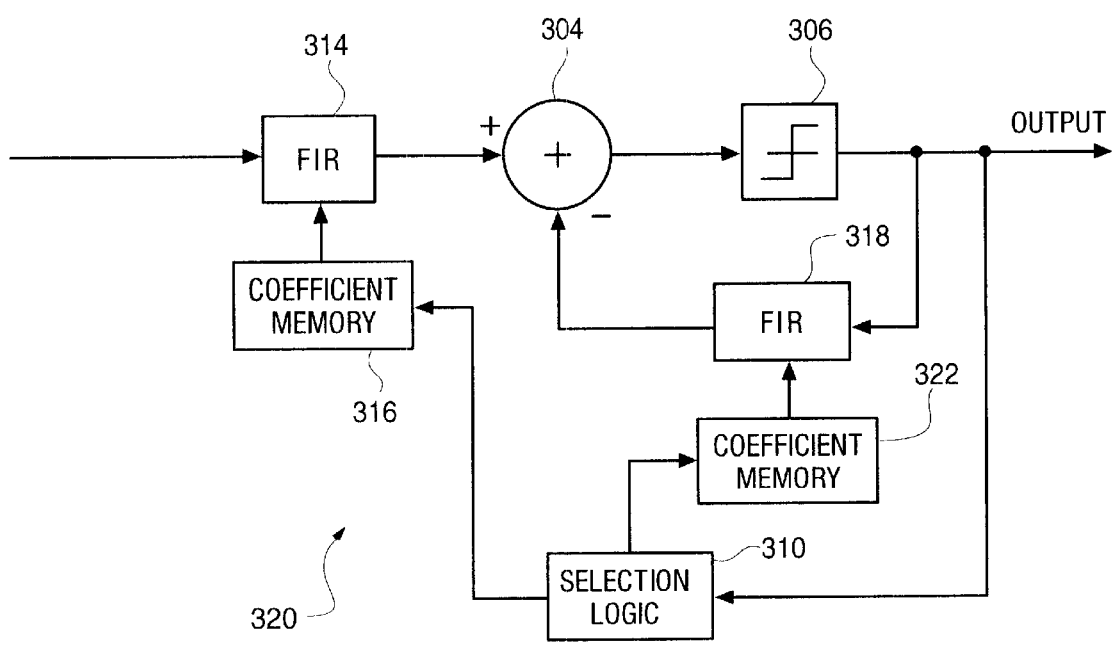

Feedback cancellation terms for cancelling ISI caused by positive and negative pulses having different peak magnitudes may be implemented within an FIR filter 318 in DFE 320 in FIG. 2C as coefficients according to the present invention. Different sets of coefficients are used to provide feedback cancellation terms, depending on the polarity and magnitude of the pulse whose ISI is being cancelled. These coefficients are stored within coefficient memory 322 and are designed to cancel tails caused by a positive and a negative pulse having different peak magnitudes according to the present invention. The particular sets of coefficients used by FIR filter 318 are selected by selection logic 310 based on the output from slicer 306.

Figure 2D:
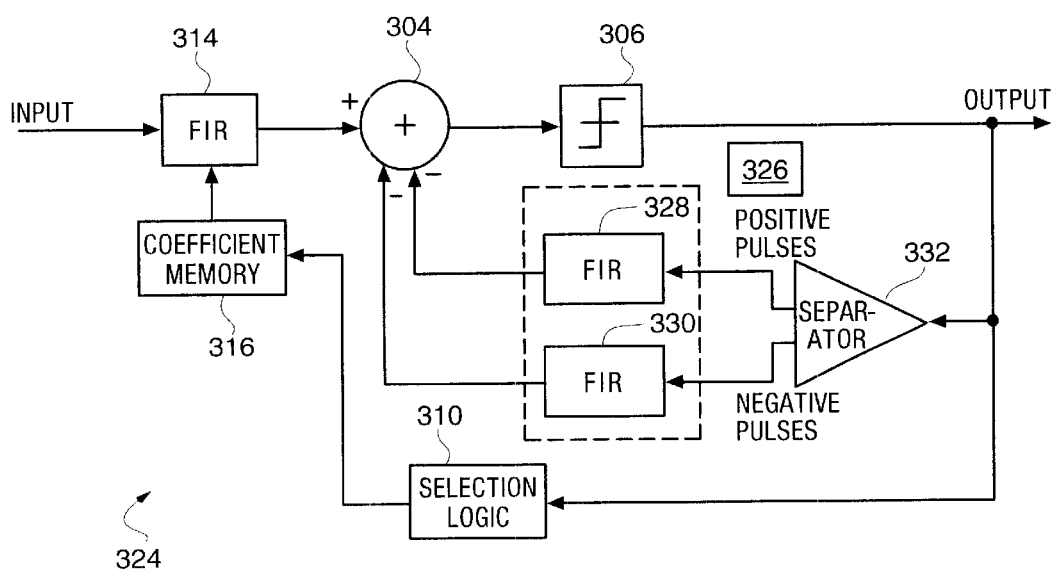

Alternatively, the FIR filter 318 may be implemented in DFE 324 in FIG. 2D using a filter bank 326 according to the present invention. Filter bank 326 includes FIR filter 328 and FIR filter 330, which have their outputs connected to summing circuit 304. The output of slicer 306 is routed to FIR filter 328 or FIR filter 330, based on pulse polarity, using separator 332. If the output of slicer 306 is being directed to FIR filter 328, a zero is being directed to FIR filter 330, and vice versa. FIR filter 328 and FIR filter 330 each contain coefficients that result in positive and negative pulses canceling to eliminate the occurrence of tails. In this manner, the presently claimed invention reduces data errors.

Figure 3:
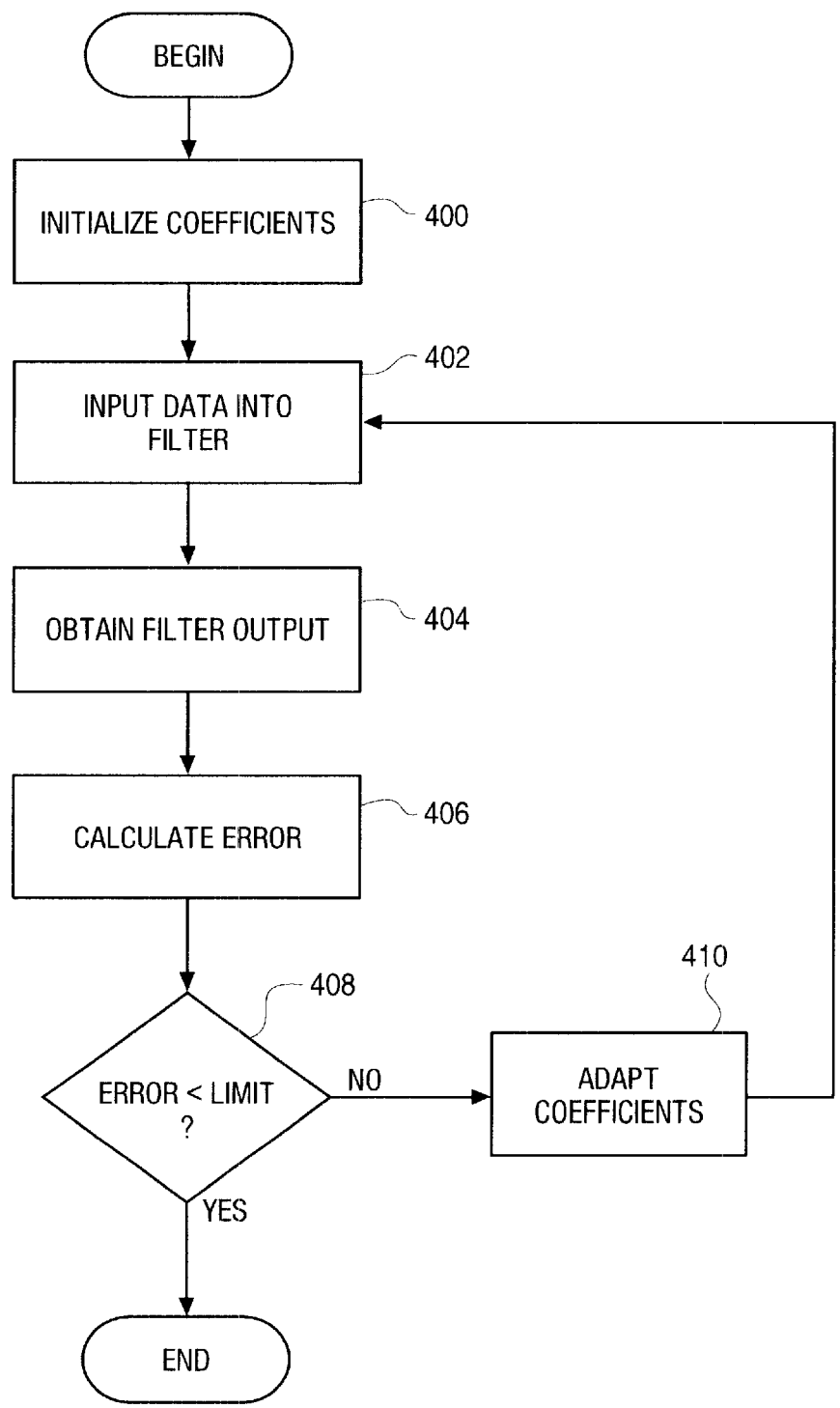
FIG. 3 is a flowchart of a process for calculating FIR filter coefficients based on data patterns and peak magnitudes of pulses depicted according to the present invention.

With reference now to FIG. 3, a flowchart of a process or calculating FIR filter coefficients based on patterns or polarities of pulses is depicted according to the present invention. The LMS algorithm is used in each case, and two or more sets of FIR filter coefficients are calculated at once. A long sequence of pulses, called a training sequence, is used in the LMS algorithm. A known data sequence, which represents the correct binary pattern for the training sequence is also used in the LMS algorithm.

In FIG. 3, coefficients of all filters are initialized in step 400. Next, training data is fed into each filter, (step 402) and all filter outputs are calculated (step 404). The filter outputs are compared to the known data sequence, generating an error signal for each FIR filter (step 406). A determination is made as to whether the error signal is less than a preselected limit or value (step 408). If the error is small enough, the process is terminated. If not, the FIR filter coefficients are adapted to reduce the error (step 410). Note that coefficients for each FIR filter are only adapted at those points in the training sequence where that filter will be used. In this way, the LMS algorithm is used to train several filters at once. Following step 410, the process is repeated starting at step 402 until the error is reduced to an acceptable level. Many variations of this process are possible, based on known methods in adaptive filtering. The coefficients determined in this process are then stored in coefficient memories 316 and 322 for use in the respective FIRs or they are used to generate FIRs for use in filter banks according to the present invention. More information on calculating FIR filter coefficients using LMS may be found in Ifeachor and Jervis, *Digital Signal Processing: A Practical Approach,* Addison-Wesley Publishers Company, Inc., 1995, ISBN No. 0-201-54413-X.

Figure 4:
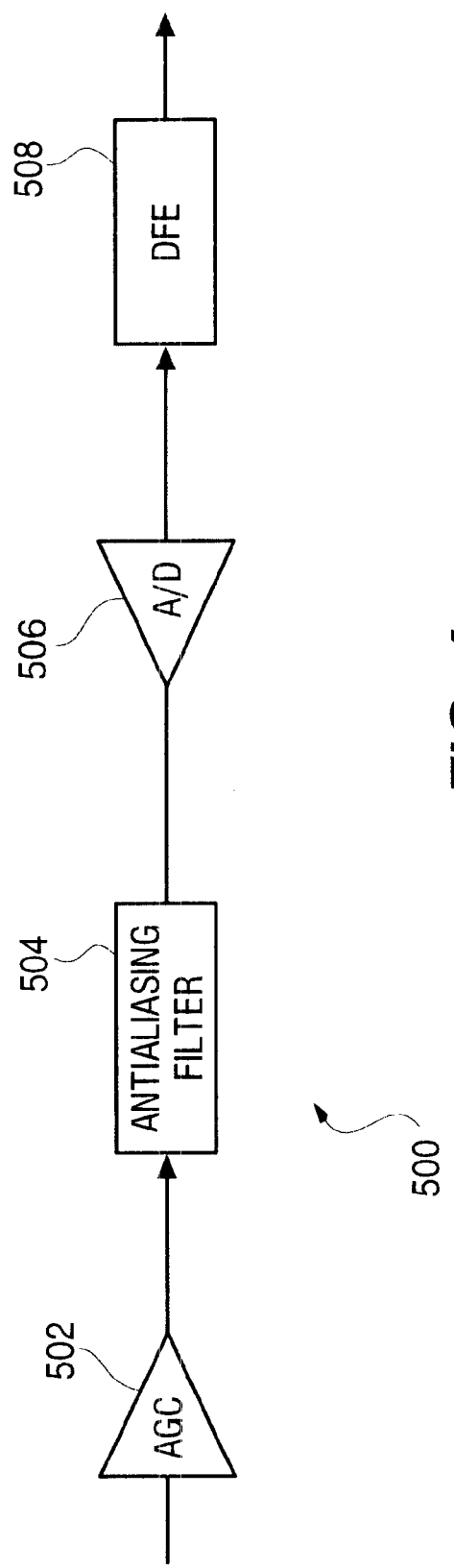
FIG. 4 is a block diagram of a read channel depicted according to the present invention.

With reference now to FIG. 4, a block diagram of a read channel is depicted according to the present invention. Read channel 500 includes automatic gain control 502, which receives an input signal from a read head (not shown). The adjusted signal is sent to antialiasing filter 504 for initial modification and then to analog to digital (A/D) converter 506. Thereafter, the signal is modified by DFE 508 in the manner described above.

Figure 5A:
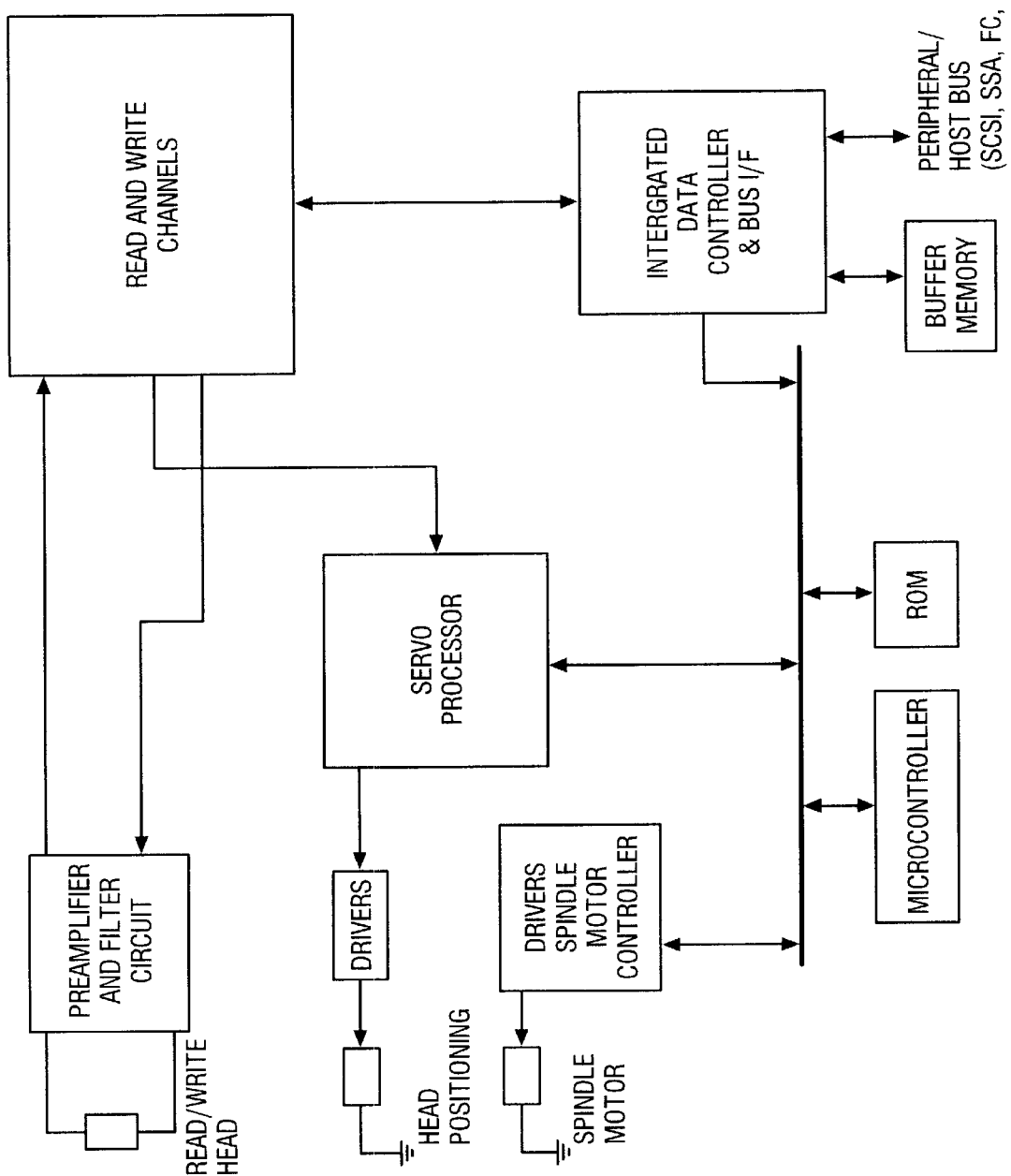
FIGS. 5A and 5B are disk drive systems depicted in which DFEs may be implemented into read channels, such as read channel 500 in FIG. 4 according to the present invention.
Figure 5B:
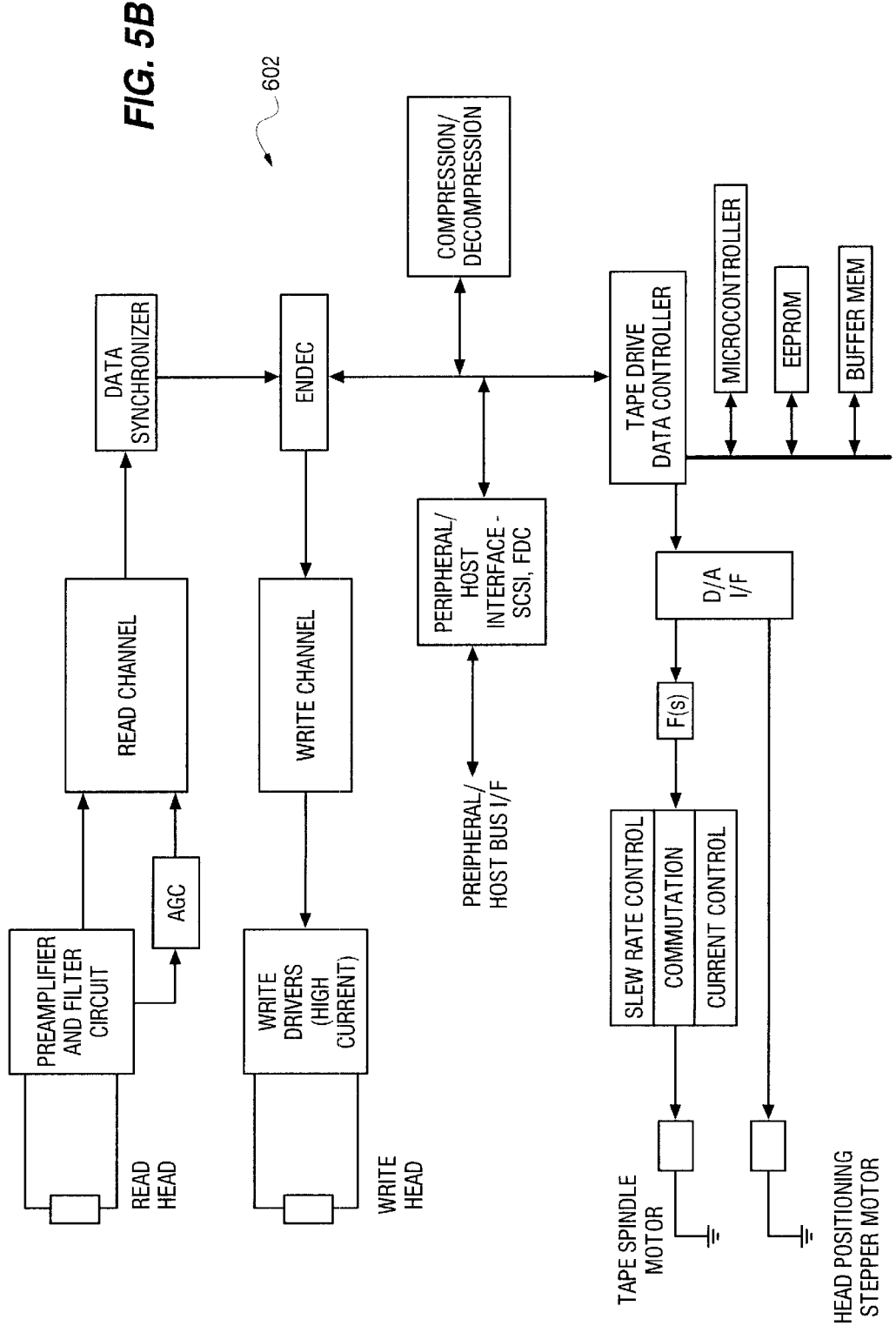

With reference now to FIGS. 5A and 5B, magnetic data storage systems, a disk drive system 600 and a tape drive system 602, are depicted in which DFEs may be implemented into read channels, such as read channel 500 in FIG. 4 according to the present invention.

Nonlinear effects are common in magnetic recording, and these can be partially compensated by forward equalizer 102 according to the present invention. Magneto resistive (MR) heads have several nonlinear characteristics that give rise to asymmetric dipulses. By keeping track of the pulse polarity, the selection logic can easily switch between two backward equalizers or two sets of coefficients one for positive pulses and one for negative pulses.

Manufacturing variation is one cause of MR head nonlinearities. Thus, a disk drive with several MR heads may contain several different types of nonlinearity. In such a situation, several sets of FIR filter coefficients can be used and chosen based on prior data and on the particular MR head being used. The coefficients may be determined through a training sequence performed during manufacturing or on power up to generate the filter coefficients for use with each individual MR head. Additionally, different coefficients may be used for each head in a multi-head drive system.

Thus, the present invention provides an improved method and apparatus for filtering data by employing a DFE having a forward equalizer whose filtering properties can be varied in response to past data output by the apparatus (e.g., a series of zeros and a one or pulse polarity). Additionally, the present invention provides additional processing of data signals using a backward equalizer that has filtering properties that can be varied in response to peaks of positive and negative pulses already processed by the apparatus.

The forward equalizer contains coefficients varying with time, being chosen from a set of possible coefficients. The selection logic examines past data and loads the best set of filter coefficients at each symbol time. Thus, the forward equalizer is tuned to specific data patterns or pulse polarity for optimal performance. Similarly, the backward equalizer has its coefficients selected based on the polarity of the detected data. The use of specific data patterns and polarity of detected data provides for optimal performance when the apparatus of the present invention is used in read channels for drive systems, such as disk drive system 600 and tape drive system 602. Thus, with the present inventions nonlinear characteristics caused by MR heads and by various read channels may be minimized using a DFE according to the present invention.

While the invention has been particularly shown and described with reference to a preferred embodiment, it will be understood by those skilled in the art that various changes in form and detail may be made therein without departing from the spirit and scope of the invention. For example, although the present invention is described with the respect to the magnetic recording channels, such as recording channels in a tape drive system or a disk drive system, the equalizers of the present invention maybe employed in other types of data channels according to the present invention.

What is claimed is:

1. A method for adjusting a filter in an equalizer comprising:

transmitting a plurality of different data patterns through the equalizer wherein the plurality of different data patterns are filtered by the filter;

producing a set of coefficients for the filter in response to each of the plurality of different data patterns to produce a number of sets of coefficients;

storing the number of sets of coefficients;

receiving data for filtering;

selecting a set of coefficients within the number of sets of coefficients based on previous data patterns transmitted through the equalizer; and utilizing the selected set of coefficients to filter data traveling through the equalizer.

2. A magnetic data storage system comprising:

read head for reading data from a magnetic media in the magnetic data storage system;

a preamplifier unit connected to the read head;

a read channel including:

an antialiasing unit having an input and the output, wherein the input is connected to the preamplifier unit;

an analog to digital converter having an input and an output, wherein the input is connected to the output of the antialiasing filter;

a decision feedback equalizer having a first filter means for adjusting an input signal; a summing means for summing signals from the first filter means and from a second filter means to produce a summed signal; a symbol detection means for generating an output signal from the summed signal; and a control means for controlling filtering properties of the first filter means and the second filter means, wherein the control means controls the filtering properties based on past data patterns in the input signal received by the decision feedback equalizer; and a data controller and bus interface unit connected to the output of the read channel, wherein the data controller and bus interface unit controls the reading and writing of data within the magnetic data storage system.

3. The magnetic data storage system of claim 2 further comprising an automatic gain control unit having an input and an output, wherein the input of the antialiasing unit is connected to the preamplifier by the automatic gain control unit and the input of the automatic gain control unit is connected to the preamplifier unit.

4. The magnetic data storage system of claim 2 wherein the magnetic data storage system is a disk drive system.

5. The magnetic data storage system of claim 2, wherein the magnetic data storage system is a tape drive system.

6. An apparatus comprising:

a plurality of sets of coefficients generated using a plurality of waveform patterns, wherein each set of coefficients within the plurality of sets of coefficients is associated with a waveform pattern within the plurality of waveform patterns;

a filter for adjusting an input waveform received by the apparatus to generate an output waveform, wherein the filter adjusts the input waveform using a set of coefficients from a plurality of sets of coefficients; and a control means for selecting the set of coefficients from the plurality of sets of coefficients based on the output waveform compared to the plurality of waveform patterns.

7. The apparatus of claim 6, wherein plurality of sets of coefficients is a first plurality of sets of coefficients and the filter is a first filter and further comprising:

a second plurality of sets of coefficients generated using a plurality of waveform patterns, wherein each set of coefficients within the plurality of sets of coefficients is associated with a waveform pattern within the plurality of waveform patterns;

a second filter for adjusting the output signal using a set of coefficients from the second plurality of sets of coefficients;

a summing means for summing signals from the first filter means and a second filter means; and a symbol detection means for generating a waveform from the summed signal, wherein the control means controls the selection of a set of coefficients used by the second filter based on the input waveform compared to the plurality of waveform patterns.

* * * * *

UNITED STATES PATENT AND TRADEMARK OFFICE
CERTIFICATE OF CORRECTION

PATENT NO. : 6,437,932 B1  Page 1 of 1
DATED : August 20, 2002
INVENTOR(S) : James S. Prater et al.

It is certified that error appears in the above-identified patent and that said Letters Patent is hereby corrected as shown below:

Title page,
Item [*] Notice, delete "0" and insert -- 1017 --.

Signed and Sealed this

Thirtieth Day of March, 2004

JON W. DUDAS
*Acting Director of the United States Patent and Trademark Office*